(12) United States Patent
Bamba et al.

(10) Patent No.: US 11,992,776 B2
(45) Date of Patent: May 28, 2024

(54) INFORMATION PROCESSING DEVICE AND INSTALLATION METHOD

(71) Applicant: SONY INTERACTIVE ENTERTAINMENT INC., Tokyo (JP)

(72) Inventors: Syunsuke Bamba, Tokyo (JP); Makoto Sunayama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 73 days.

(21) Appl. No.: 17/439,841

(22) PCT Filed: Mar. 26, 2020

(86) PCT No.: PCT/JP2020/013745
§ 371 (c)(1),
(2) Date: Sep. 16, 2021

(87) PCT Pub. No.: WO2020/203669
PCT Pub. Date: Oct. 8, 2020

(65) Prior Publication Data
US 2022/0088494 A1    Mar. 24, 2022

(30) Foreign Application Priority Data
Apr. 3, 2019   (JP) ................. 2019-071583

(51) Int. Cl.
*A63F 13/533*   (2014.01)
*A63F 13/77*    (2014.01)
*A63F 13/95*    (2014.01)

(52) U.S. Cl.
CPC ............ *A63F 13/95* (2014.09); *A63F 13/533* (2014.09); *A63F 13/77* (2014.09); *A63F 2300/552* (2013.01)

(58) Field of Classification Search
None
See application file for complete search history.

(56) References Cited

U.S. PATENT DOCUMENTS

2006/0064421 A1*  3/2006  Futagawa ............... G06F 9/485
2008/0171600 A1   7/2008  Ostergren et al.
(Continued)

FOREIGN PATENT DOCUMENTS

CN    108111555 A   6/2018
JP    2008282251 A  11/2008
(Continued)

OTHER PUBLICATIONS

YouTube video "Custom Installation Is a Great Option | Halo: The Master Chief Collection"—https://www.youtube.com/watch?v=ctnJljtz4B4 to GamerJlee, Jul. 4, 2018 (Year: 2018).*
(Continued)

*Primary Examiner* — Damon J Pierce
(74) *Attorney, Agent, or Firm* — XSENSUS LLP

(57) ABSTRACT

A play mode selection screen image displaying section 108 displays a screen image for selecting a play mode relating to installation of game software 70. An installation execution section 110 installs game software into a storage device. When the game software is to be installed for the first time, the play mode selection screen image displaying section 108 displays a first selection screen image for selecting a play mode to install first from a plurality of play modes. Thereafter, the play mode selection screen image displaying section 108 displays a second selection screen image for selecting a play mode not to install or a play mode to install.

18 Claims, 16 Drawing Sheets

(56) References Cited

U.S. PATENT DOCUMENTS

| | | | |
|---|---|---|---|
| 2011/0013879 A1 | 1/2011 | Osawa et al. | |
| 2013/0159928 A1* | 6/2013 | Joynes | A63F 13/92 715/810 |
| 2014/0201209 A1 | 7/2014 | Hashimoto et al. | |
| 2017/0048117 A1* | 2/2017 | Tsuchiya | H04L 67/34 |
| 2019/0111340 A1* | 4/2019 | Sung | H04W 4/80 |

FOREIGN PATENT DOCUMENTS

| | | |
|---|---|---|
| JP | 2008310777 A | 12/2008 |
| JP | 2015-207145 A | 11/2015 |
| JP | 2018019833 A | 2/2018 |
| WO | 2018150155 A2 | 8/2018 |

OTHER PUBLICATIONS

YouTube Video "Steam—Uninstall/Reinstall Games"—https://www.youtube.com/watch?v=7kfUAFd_VUQ&t=12s to Anson Alexander, Sep. 20, 2016 (Year: 2016).*

International Search Report and Written Opinion dated May 26, 2020, from PCT/JP2020/013745, 8 sheets.

Notice of Reasons for Refusal dated Nov. 15, 2022, from Japanese Patent Application No. 2019-071583, 2 sheets.

The extended European search report dated Dec. 19, 2022, from European Patent Application No. 20783510.9, 9 sheets.

* cited by examiner

F I G. 6

| GROUP | #1 | #2 | #3 | #4 | #5 | ... |
|---|---|---|---|---|---|---|
| FILE | A,B,C,D,E,F | G,H | I,J | K,L | M,N | ... |
| | 72a | 72b | 72c | 72d | 72e | |

FIG. 9

DOWNLOAD OPTION

SELECT PLAY MODE NOT TO DOWNLOAD
(NOTE THAT, EVEN IF PLAY MODE IS NOT DOWNLOADED NOW, PLAY MODE CAN BE DOWNLOADED LATER)

☐ SP MODE

☑ PvP MODE

☐ PvE MODE

RETURN

DOWNLOAD — 200

DOWNLOAD OPTION

AVAILABLE CAPACITY OF STORAGE DEVICE IS
INSUFFICIENT TO DOWNLOAD FOLLOWING GAME

CAPACITY SHORTAGE AMOUNT: 18 GB

[ABC BATTLE]

• SP MODE   10GB

• PvE MODE  12GB

IN ORDER TO DOWNLOAD, IT IS NECESSARY TO UNINSTALL GAME OR GAMES THAT ARE ALREADY INSTALLED

200

| CANCEL DOWNLOAD THIS TIME | UNINSTALL GAME OR GAMES THAT ARE ALREADY INSTALLED |

4

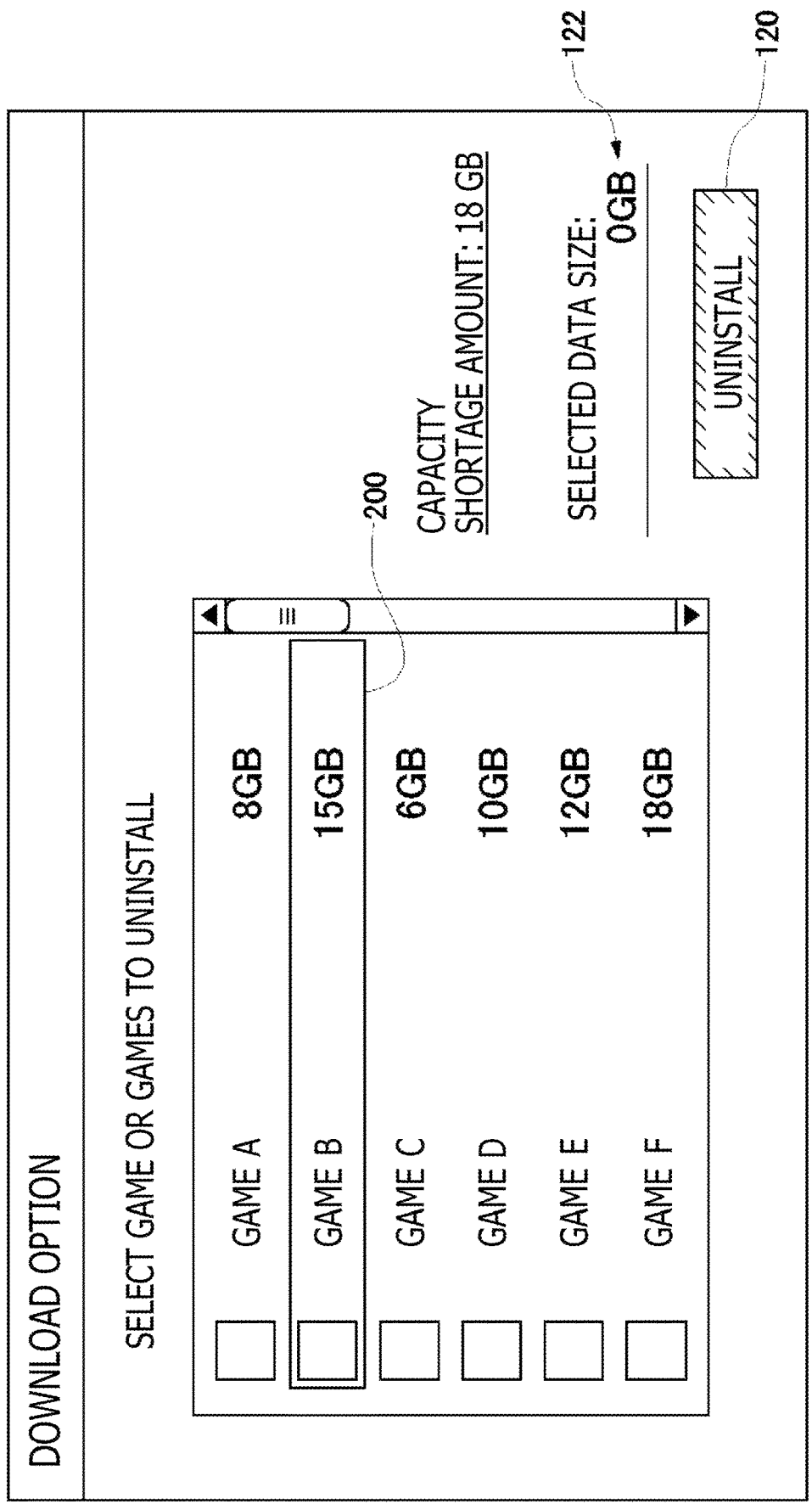

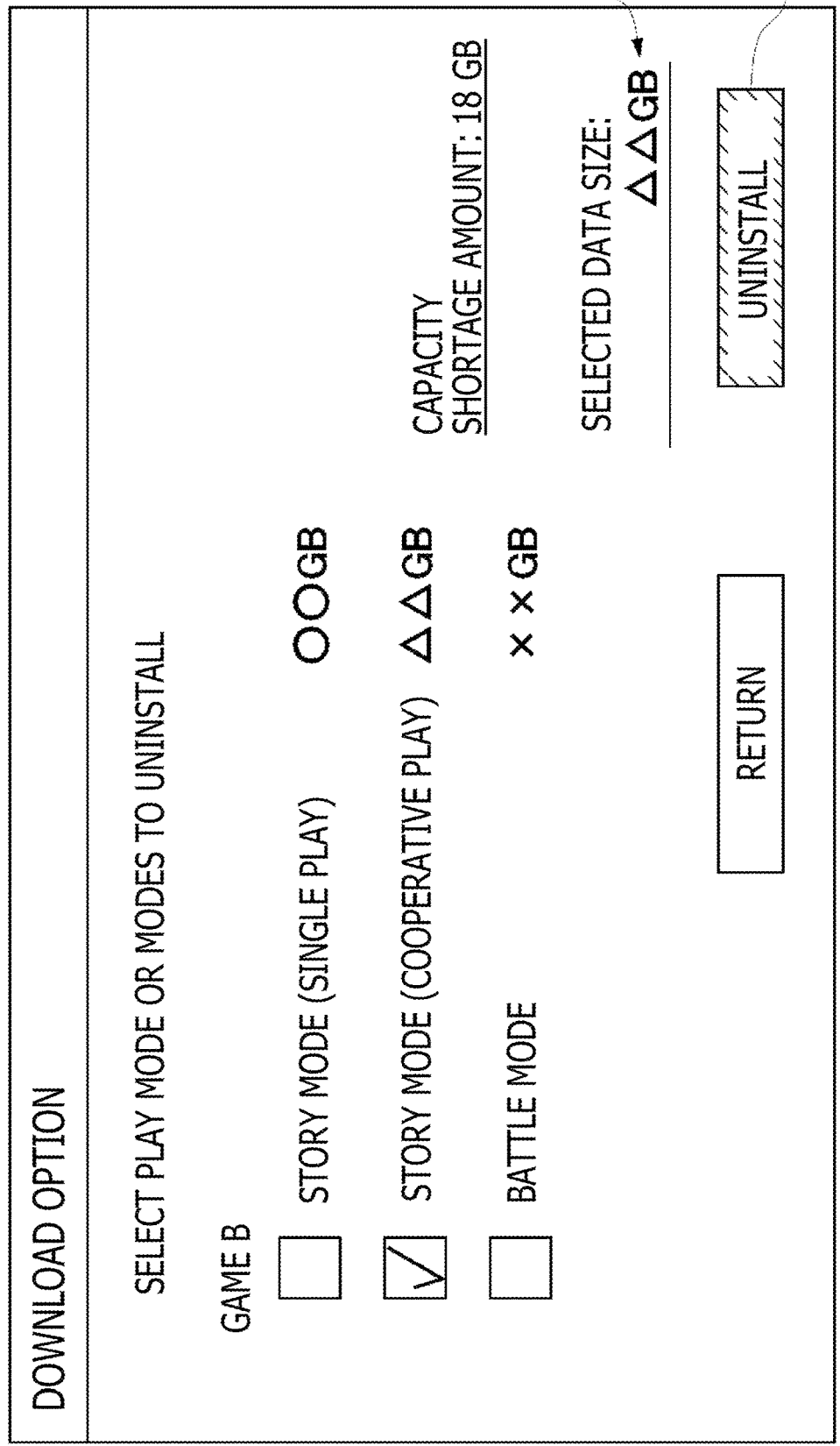

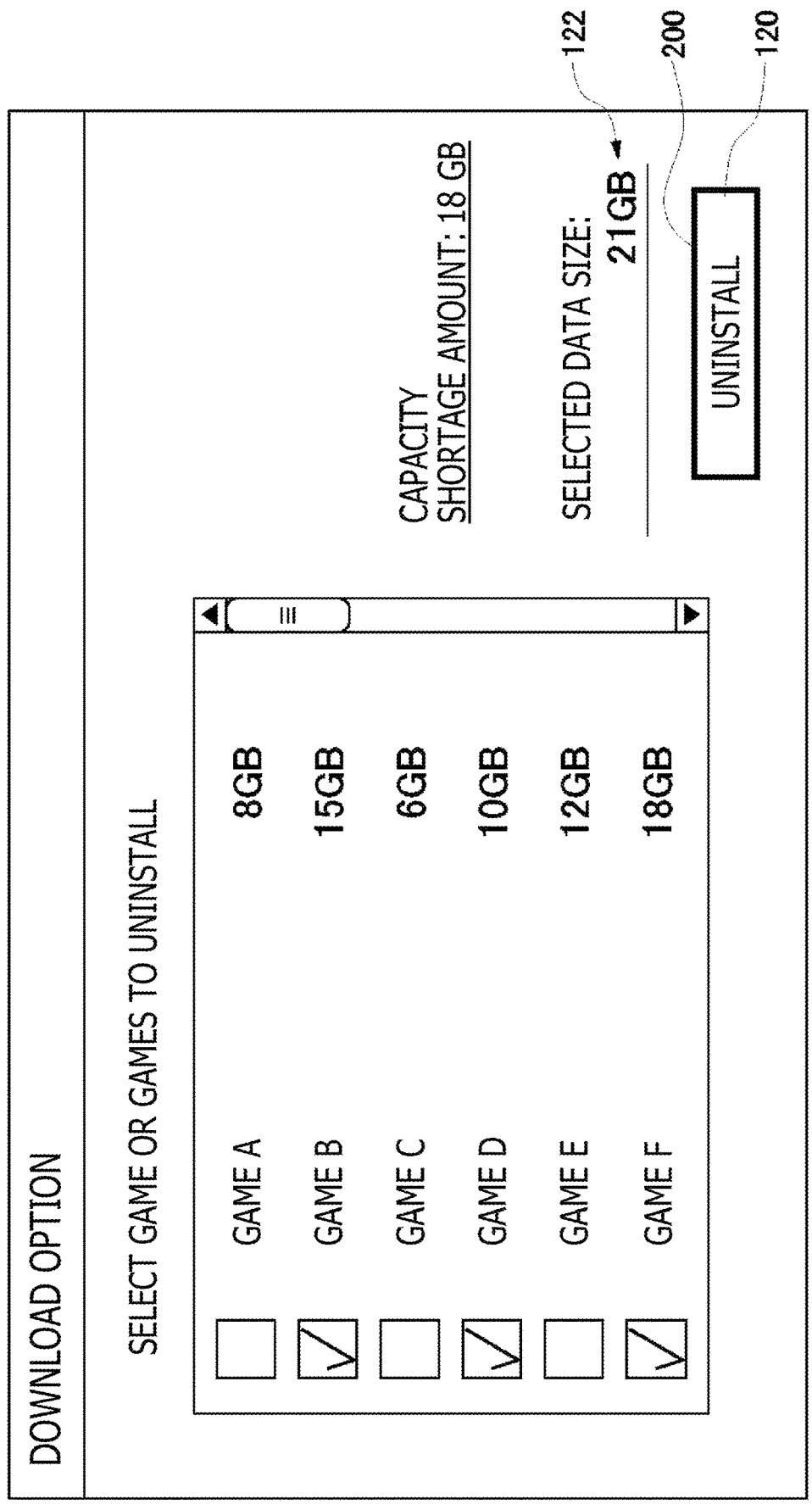

INFORMATION PROCESSING DEVICE AND INSTALLATION METHOD

TECHNICAL FIELD

The present invention relates to a technology for installing game software.

BACKGROUND ART

Conventionally, game software has been distributed and sold in the form of a read-only memory (ROM) medium such as an optical disk, a magneto-optical disk, or a Blu-ray disk. Together with increase in speed of data communication, it has recently become possible for a server to distribute an image file of game software through the Internet.

Game software includes a plurality of files for executing a game such as a start-up file and a game program and a plurality of files that are used by an operating system (OS) for a game device. In recent years, the number of files included in game software has become great, and there is a tendency that the data size becomes great.

PTL 1 discloses a group structure in which game software is divided into a plurality of groups such that a program file and a data file necessary for start-up of the game software belong to one of the groups (first group).

According to the technology disclosed in PTL 1, if download and installation of all files belonging to the first group are completed, then even if files of second and succeeding groups are not installed, the game software can be started up. The files belonging to the second and succeeding groups can be downloaded on the background while a user is playing the game and can be installed into an auxiliary storage device. This reduces waiting time for the user before the game is started.

CITATION LIST

Patent Literature

[PTL 1]
U.S. Patent Application Publication No. 2014/201209

SUMMARY

Technical Problem

Increased data size of game software consumes a large part of the storage capacity of a storage device for a game device.

Therefore, it is an object of the present invention to efficiently install game software.

Solution to Problem

In order to solve the problem described above, an information processing device according to an aspect of the present invention includes a play mode selection screen image displaying section that displays a screen image for selecting a play mode relating to installation of game software and an installation execution section that installs game software into a storage device. When the game software is to be installed for the first time, the play mode selection screen image displaying section first displays a first selection screen image for selecting a play mode to install first from a plurality of play modes and then displays a second selection screen image for selecting a play mode not to install or a play mode to install.

Another aspect of the present invention is an installation method, and this method includes a step of displaying a first selection screen image for selecting a play mode to install first from a plurality of play modes, a step of displaying a second selection screen image for selecting a play mode not to install or a play mode to install, and a step of installing game software on the basis of information inputted to the first selection screen image and the second selection screen image.

It is to be noted that any combinations of the constituent elements described above and representations of the present invention obtained by conversion between a method, a device, a system, a recording medium, a computer program, and so forth are also effective as modes of the present invention.

BRIEF DESCRIPTION OF DRAWINGS

FIG. 6 is a view depicting an example of a group file.

FIG. 9 is a view depicting an example of a second selection screen image for selecting a play mode.

FIG. 13 is a view depicting an example of a screen image for notification that the available capacity is insufficient.

FIG. 14 is a view depicting an example of a screen image for selecting a game to uninstall.

FIG. 15 is a view depicting an example of a screen image for selecting a play mode to uninstall.

FIG. 16 is a view depicting an example of a screen image for selecting a game to uninstall.

DESCRIPTION OF EMBODIMENTS

Figure 1:
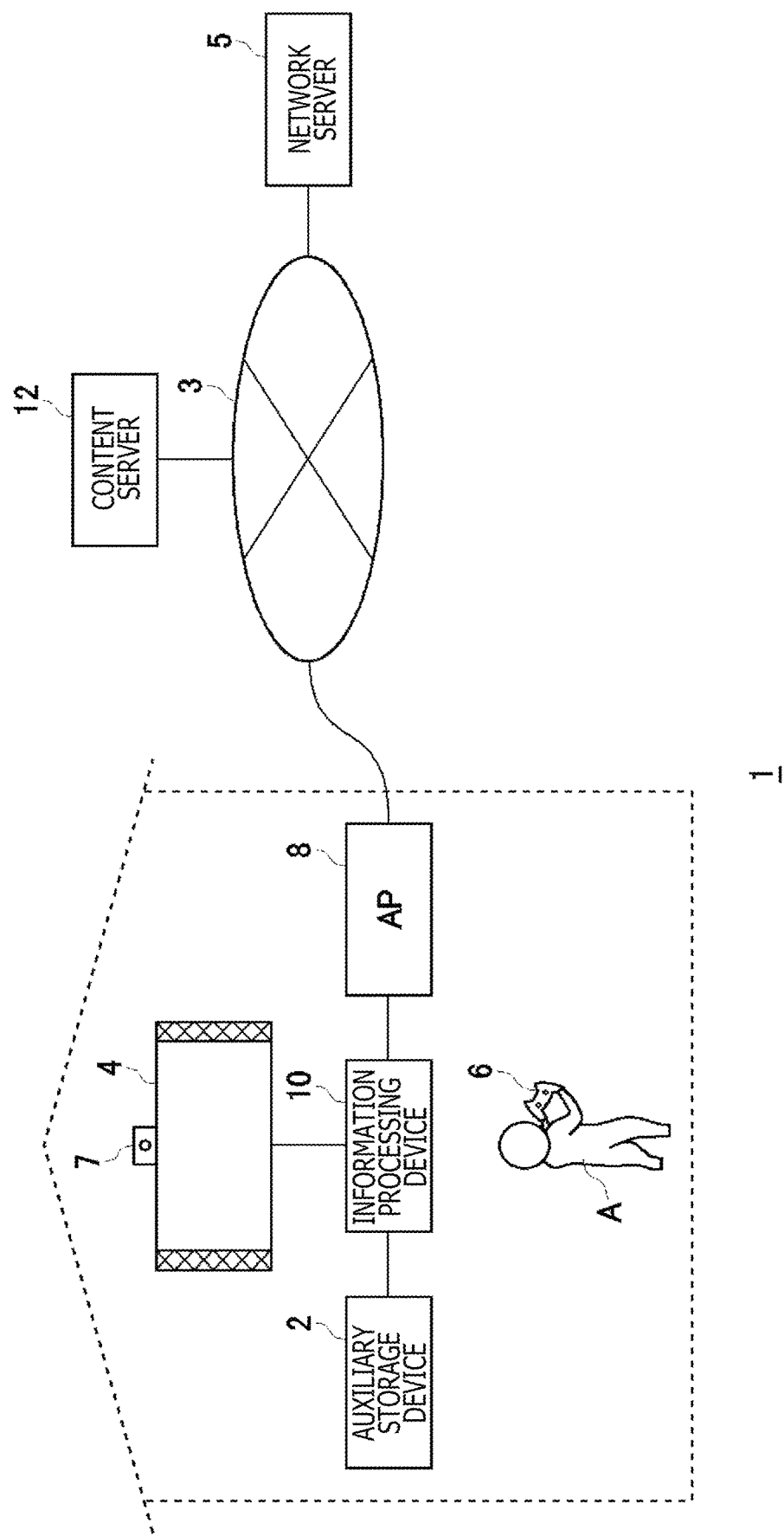
FIG. 1 is a view depicting an information processing system according to an embodiment.

FIG. 1 depicts an information processing system 1 according to an embodiment of the present invention. The information processing system 1 includes an information processing device 10, a network server 5, and a content server 12 that distributes digital content, and they are connected to each other by a network 3 such as the Internet or a local area network (LAN). The content server 12 retains digital content such as game software and distributes it to the information processing device 10.

An access point (hereinafter referred to as an "AP") 8 has functions of a wireless access point and a router, and the information processing device 10 establishes connection to the AP 8 by wireless or wired connection so as to be connected for communication with the network server 5 and the content server 12 on the network 3.

The information processing device 10 establishes connection to an inputting device 6, which is operated by a user, by wireless or wired connection, and the inputting device 6 outputs information of operation made by the user to the information processing device 10. When the information processing device 10 accepts operation information from the inputting device 6, then it reflects the operation information on processing of an OS (system software) or game software and causes an outputting device 4 to output a result of the processing. In the information processing system 1, the information processing device 10 may be a terminal device such as a game device that executes game software or a personal computer, and the inputting device 6 may be a device such as a game controller that supplies information of operation made by the user to the information processing device 10. The user can operate the OS and the game software by logging in to the OS of the information processing device 10.

The network server 5 is maintained and managed by an operating entity of the information processing system 1 and provides a network service to users of the information processing system 1. The network server 5 manages network accounts for identifying each of the users, and each user uses its network account to sign in to the network service provided by the network server 5. By signing in to the network service from the information processing device 10, the user can receive distribution of digital content from the content server 12 and can record saved data of a game and so forth into the network server 5. It is to be noted that the content server 12 may have a user management function of the network server 5. Although the digital content may be various kinds of application software, in the following description, a case is specifically described in which the digital content is game software.

An auxiliary storage device 2 is a large-capacity storage device such as a hard disk drive (HDD) or a solid state drive (SSD) and may be a built-in storage device or an external storage device connected to the information processing device 10 by a universal serial bus (USB) or the like. The outputting device 4 may be a television set that includes a display that outputs an image and a speaker that outputs sound or may be a head-mounted display. The outputting device 4 may be connected to the information processing device 10 by a wire cable or by wireless connection.

The inputting device 6 includes a plurality of inputting sections such as a plurality of push-type operation buttons, an analog stick that can input an analog amount, and a rotary-type button. A camera 7 that is an imaging device is provided in the proximity of the outputting device 4 and captures an image of a space around the outputting device 4. Although FIG. 1 depicts an example in which the camera 7 is attached to an upper portion of the outputting device 4, the camera 7 may otherwise be arranged at a side portion of the outputting device 4. In any case, the camera 7 is arranged at a position at which it can capture an image of the user who plays a game in front of the outputting device 4. The camera 7 may be a stereo camera. The information processing device 10 has a function of performing face authentication of the user based on an image captured by the camera 7 to allow the user to log in to the information processing device 10.

Figure 2:
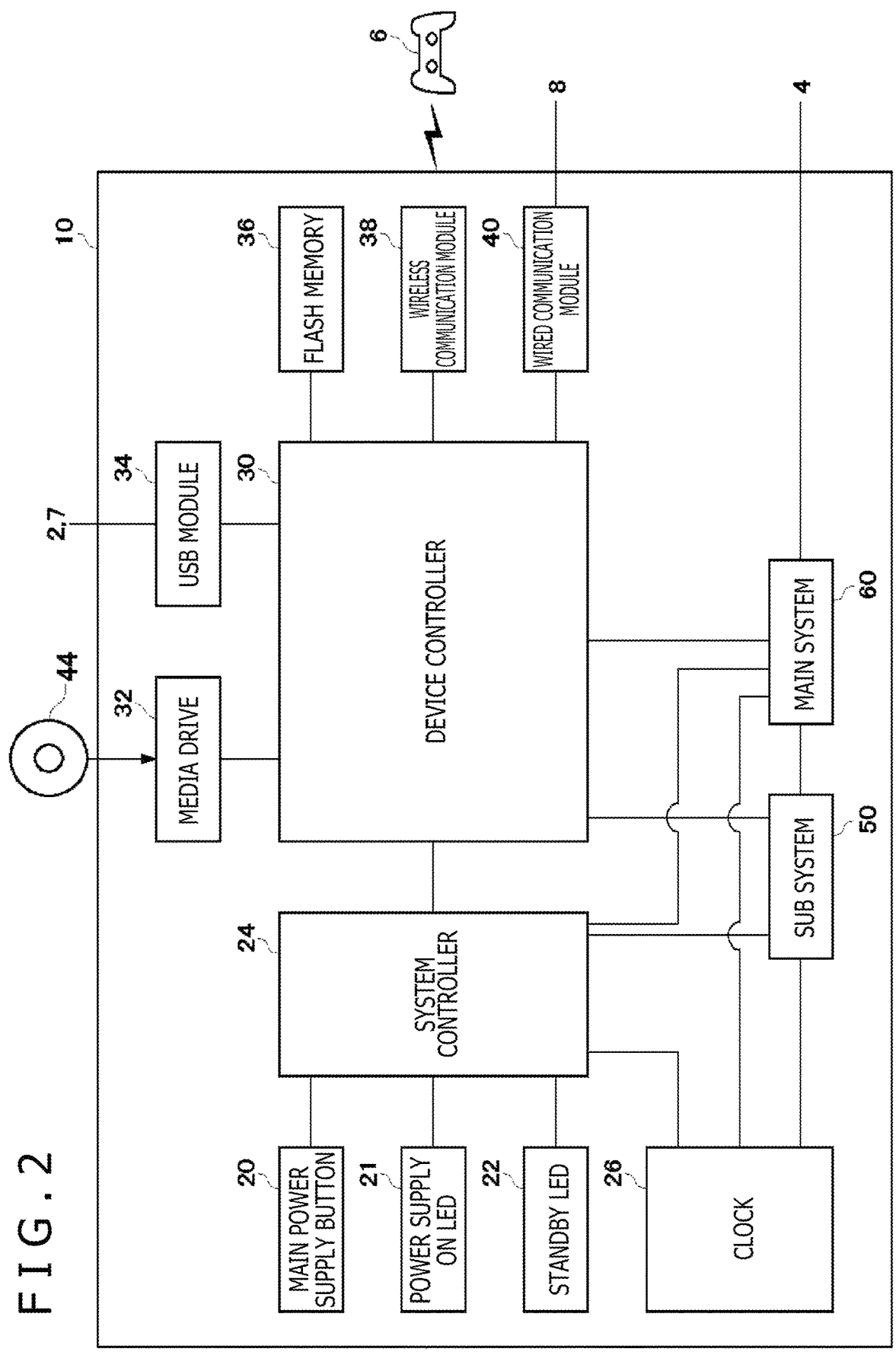
FIG. 2 is a view depicting a hardware configuration of an information processing device.

FIG. 2 depicts a hardware configuration of the information processing device 10. The information processing device 10 includes a main power supply button 20, a power supply ON light-emitting diode (LED) 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main central processing unit (CPU), a memory that is a main storage device, a memory controller, a graphics processing unit (GPU), and so forth. The GPU is used principally for arithmetic operation processing of a game program. These functions may be configured as a system on-chip and formed on a single chip. The main CPU has a function of executing game software recorded in the auxiliary storage device 2 or a ROM medium 44.

The sub system 50 includes a sub CPU, a memory that is a main storage device, a memory controller, and so forth but does not include a GPU, nor does it have a function of executing a game program. The number of circuit gates of the sub CPU is smaller than the number of circuit gates of the main CPU, and operation power consumption of the sub CPU is lower than operation power consumption of the main CPU. The sub CPU operates also when the main CPU is in a standby state, and is restricted in its processing function so as to suppress the power consumption low.

The main power supply button 20 is a button to which operation inputting is performed by the user, and is provided on a front face of a housing of the information processing device 10 to be operated for switching on or off the power supply to the main system 60 of the information processing device 10. The power supply ON LED 21 is turned on when the main power supply button 20 is switched on, and the standby LED 22 is turned on when the main power supply button 20 is switched off.

The system controller 24 detects depression of the main power supply button 20 by the user. If the main power supply button 20 is depressed when the main power supply is in an off state, then the system controller 24 acquires the depression operation as an "on instruction." If the main power supply button 20 is depressed when the main power supply is in an on state, on the other hand, the system controller 24 acquires the depression operation as an "off instruction."

The clock 26 is a real-time clock and generates current date and time information to supply it to the system controller 24, the sub system 50, and the main system 60.

The device controller 30 is configured as a large-scale integrated circuit (LSI) that executes transfer of information between devices like a south bridge. As depicted in FIG. 2, to the device controller 30, such devices as the system controller 24, the media drive 32, the USB module 34, the flash memory 36, the wireless communication module 38, the wired communication module 40, the sub system 50, and the main system 60 are connected. The device controller 30 absorbs a difference in electric characteristic and a difference in data transfer speed between the devices to control the timing of data transfer.

The media drive 32 is a drive device that accepts and drives a ROM medium 44 in which application software of a game and so forth is recorded to read out a program, data, and so forth from the ROM medium 44. Although, in the following description, where programs and data are not specifically distinguished from each other, they are sometimes collectively referred to as data, the term "data" is used also as a term representing an element that configures a file. The ROM medium 44 is a read-only recording medium such as an optical disk, a magneto-optical disk, or a Blu-ray disk.

In the embodiment, the game software recorded in the ROM medium 44 is all copied and installed into the auxiliary storage device 2. The main system 60 executes the game software installed in the auxiliary storage device 2.

The USB module 34 is a module that connects to external equipment by a USB cable. The USB module 34 may connect to the auxiliary storage device 2 and the camera 7 by a USB cable. The flash memory 36 is an auxiliary storage device that configures an internal storage. The wireless communication module 38 communicates, for example, with the inputting device 6 by wireless communication using a communication protocol such as the Bluetooth (registered trademark) protocol or the IEEE 802.11 protocol. It is to be noted that the wireless communication module 38 may support a digital mobile phone system. The wired communication module 40 communicates with external equipment by wired communication and connects to the network 3 through the AP 8.

Referring back to FIG. 1, the content server 12 distributes game software to the information processing device 10. The game software includes a plurality of files for executing a game such as a start-up file and a game program and a plurality of files that are used by the OS of the information processing device 10, and the content server 12 provides the information processing device 10 with an image file of the game software recorded originally on the ROM medium 44. The game program is a program necessary for execution of the game, and the game progresses by running of the game program. The start-up file is a program for starting up the game program, and when the start-up file is executed, then the game program is called and executed. The files used by the OS include, for example, game icon images and so forth to be displayed on a menu screen image of the information processing device 10.

The game software has a tree-type directory structure, and the start-up file is included in a root directory of the highest layer. Subdirectories of lower layers are classified for each file type, and for example, a subdirectory for three-dimensional (3D) models, a subdirectory for textures, a subdirectory for scripts, and so forth are formed. Each subdirectory includes corresponding files, and a plurality of 3D model files are included in the subdirectory for 3D models, a plurality of texture files are included in the subdirectory for textures, and a plurality of script files are included in the subdirectory for scripts. For example, the subdirectory for textures includes a texture file for a scene 1, a texture file for a scene 2, a texture file for a scene 3, and so forth of the game.

Figure 3:
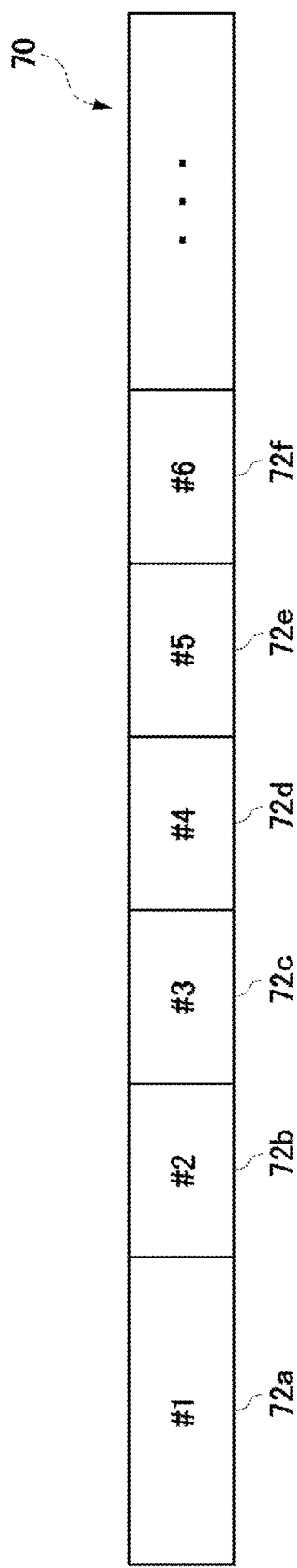
FIG. 3 is a conceptual diagram of a file configuration of game software.

FIG. 3 depicts a conceptual view of a file configuration of game software. Game software 70 in the embodiment includes a plurality of files and is logically divided into a plurality of groups 72 as depicted in FIG. 3. Each file belongs to at least one of the plurality of groups 72, and at least one file belongs to each group 72. In the game software 70 depicted in FIG. 3, a first group 72a exists as a top group, and as succeeding groups, a second group 72b, a third group 72c, a fourth group 72d, a fifth group 72e, and a sixth group 72f exist. It is to be noted that seventh and succeeding groups 72 may follow the sixth group 72f. Each group is identified by a group number such as "first" or "second."

To each of the logically divided groups, files included in a plurality of subdirectories belong. In other words, each group includes files of different types and is set such that files necessary when the information processing device 10 executes a specific unit such as a scene or a stage in the game belong thereto.

To the first group 72a, a program file and a data file necessary to start up the game software 70 belong. Accordingly, where the information processing device 10 is to acquire the game software 70 from the content server 12, if all files belonging to the first group 72a are downloaded, then even if files of the second group 72b and the succeeding groups are not downloaded, the information processing device 10 can start up the game software 70 immediately. It is to be noted that, after the information processing device 10 acquires all the files belonging to the first group 72a and starts up the game software 70, it downloads files belonging to the succeeding groups 72 on the background. In this manner, by downloading minimal files necessary for execution of the game first and enabling execution of the game on completion of download of these files, it is possible to reduce download waiting time for the user. It is to be noted that, in the embodiment, both the game software 70 recorded on the ROM medium 44 and the game software 70 downloaded from the content server 12 or the like have a data structure having the same files and the same directory configuration.

Figure 4:
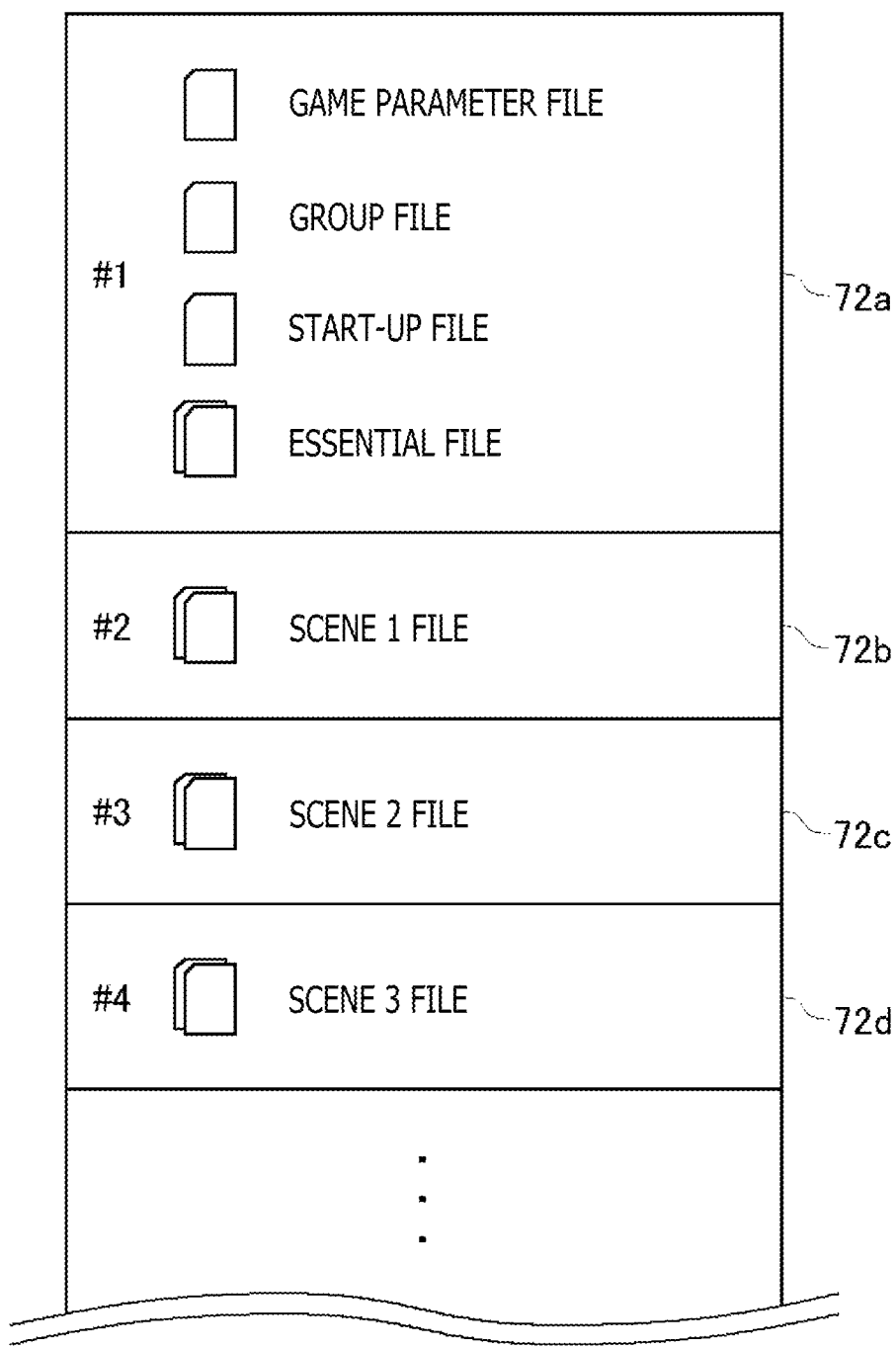
FIG. 4 is a view depicting an example of a particular file configuration of game software.

FIG. 4 depicts an example of a particular file configuration of game software. The first group 72a includes a plurality of files to be downloaded first in the game software 70, and here, a game parameter file, a group file, a start-up file, and essential files are indicated.

Here, the game parameter file is a file used by the OS of the information processing device 10 and includes, for example, such information as title identification (ID) and a display resolution, icon image data, and so forth.

The group file is a definition file that describes in which group each file is included. While the group file may be represented, for example, by the extensible markup language (XML), it may otherwise be represented by another program language and may be represented in any format. The group file describes a plurality of groups whose installation is necessary when play modes provided in the game are to be executed.

The start-up file is a program for starting up the game program. Further, the essential files include a file of a program required for executing the game, a common file used in the entire game, and so forth.

Where the information processing device 10 downloads the game software 70 from the content server 12, it can start up the game if it acquires and installs all of the files belonging to the first group 72a. Conversely speaking, the first group 72a includes a plurality of files necessary for the user to play part of the game. Here, the game play here may include setting operations of the user to be performed at the time of starting of the game, such as to decide a character or decide a game level. In other words, the first group 72a includes a plurality of files necessary to start up the game and establish a state in which the user can perform at least some operation. The game play that can be executed by using the files included in the first group 72a may be, for example, only initial settings for the game or may be such settings that enable playing of the game up to its first stage. This depends upon the game manufacturer.

In the example depicted in FIG. 4, a plurality of files for the scene 1 belong to the second group 72b, a plurality of files for the scene 2 belong to the third group 72c, and a plurality of files for the scene 3 belong to the fourth group 72d. In particular, the plurality of files in each group include a program, a 3D model file for a specific scene, a texture file, a script file, and so forth and include files included in a plurality of subdirectories of the directory structure.

Figure 5:
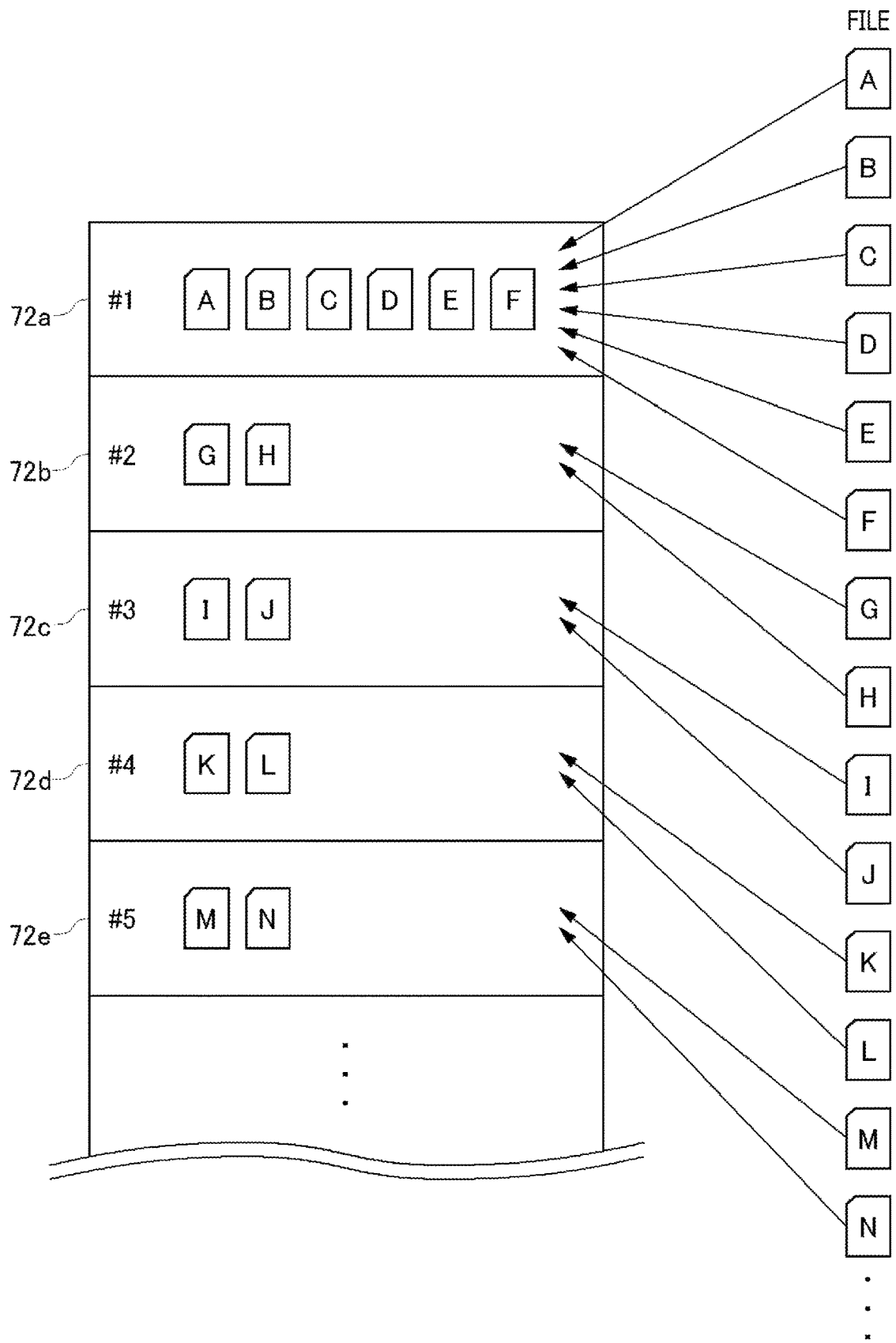
FIG. 5 is a view depicting an example of a relation between groups and files.

FIG. 5 depicts an example of a relation between groups and files. Here, it is depicted that files A to N belong to the groups 72. As depicted in FIG. 5, each file belongs to one of the plurality of groups 72, and at least one file belongs to each group 72.

FIG. 6 depicts an example of a group file. As described hereinabove, a group file may be represented by the XML or may be represented by another program language. In FIG. 6, a group file is depicted in which a corresponding relation between groups and files is represented in the form of a table in order to facilitate understanding. When the information processing device 10 downloads each file of the game software 70, it can refer to the group file to determine whether or not download of all files belonging to a certain group is completed. For example, in regard to the first group 72a, by referring to the group file, the information processing device 10 can recognize that files belonging to the first group 72a are the files A, B, C, D, E, and F, and therefore, if these files are recorded in the auxiliary storage device 2, then the information processing device 10 determines that download of all the files belonging to the first group 72a is completed. It is to be noted that the group file may be any one of the files A to F. Since the game software 70 includes a plurality of groups in this manner, the information processing device 10 downloads the files in a unit of a group.

In the game software 70, a plurality of play modes are often provided in order to offer various ways to enjoy the game. Various play modes exist depending upon the game type and, for example, for battle type games, a single play (SP) mode in which the game is played by one player, a player versus player (PvP) mode in which players compete with each other, a player versus enemy (PvE) in which a plurality of players cooperate with each other to fight against a non-player character (NPC), and so forth are provided by the game manufacturer.

In the game software 70 of the embodiment, a plurality of groups for executing each play mode are defined. In regard to the play modes described above, a plurality of groups for executing the SP mode, a plurality of groups for executing the PvP mode, and a plurality of groups for executing the PvE mode are defined. The plurality of groups of each play mode are defined in the group file.

In the information processing system 1 of the embodiment, before download of the game software 70 is started, the user selects a play mode that the user wants to play first from the plurality of play modes. The information processing device 10 downloads the groups for executing the play mode selected by the user preferentially to, that is, earlier than, the groups of the other play modes and installs them into the auxiliary storage device 2.

Figure 7:
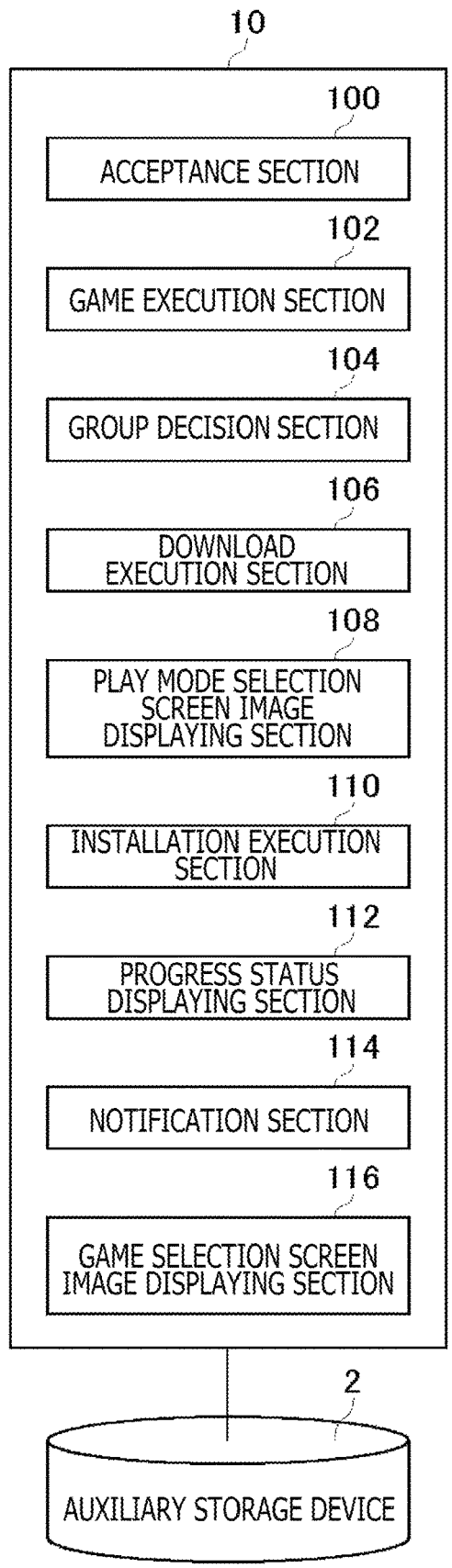
FIG. 7 is a view depicting functional blocks of the information processing device.

FIG. 7 depicts functional blocks for executing an installation process of the information processing device 10. Here, the installation process is a process for storing the game software 70 into the auxiliary storage device 2 so as to make it executable. While, in the embodiment, the information processing device 10 downloads the game software 70 from the content server 12 and installs the game software 70 into the auxiliary storage device 2, it may otherwise acquire the game software 70 from the ROM medium 44 and install the game software 70 into the auxiliary storage device 2.

The information processing device 10 includes an acceptance section 100, a game execution section 102, a group decision section 104, a download execution section 106, a play mode selection screen image displaying section 108, an installation execution section 110, a progress status displaying section 112, a notification section 114, and a game selection screen image displaying section 116. While the components mentioned are implemented, as hardware components, by a CPU of any computer, a memory, a program loaded in the memory, a storage, and so forth, here in FIG. 7, functional blocks that are implemented by cooperation of them are depicted. Accordingly, it is recognized by those skilled in the art that such functional blocks as described above can be implemented in various forms only from hardware, only from software, or from a combination of hardware and software.

The acceptance section 100 accepts operation information of an operation performed by the user on the inputting device 6. The download execution section 106 downloads the game software 70 from the content server 12 and accumulates, during the downloading, an amount of data that has been downloaded.

The auxiliary storage device 2 is utilized as a storage device for storing a plurality of files configuring the game software 70. The download of the game software 70 is executed in a unit of a group. For example, in a case where files X, Y, and Z belong to a group S, if a request for download of the group S is generated, then the files X, Y, and Z are downloaded from the content server 12, and all the files X, Y, and Z belonging to the group S are installed into the auxiliary storage device 2.

The progress status displaying section 112 has a function of displaying a progress status of installation on the outputting device 4. In the embodiment, since the download execution section 106 downloads the game software 70 for each play mode, the progress status displaying section 112 displays the progress status of the installation of the play modes in the form of a single progress bar on the outputting device 4.

The installation execution section 110 installs the downloaded game software 70 into the auxiliary storage device 2. The game execution section 102 executes the game by using the installed game software 70. As described hereinabove, if the game software 70 in the first group is installed, then the game execution section 102 can immediately execute the game. It is to be noted that, while, in the embodiment, a game is indicated as an example of an application, the game execution section 102 may have a function of executing an application other than the game application.

A particular installation procedure in the information processing device 10 is described.

Upon purchase of game software by a user, the acceptance section 100 receives an address of a sales website of the game software and causes the outputting device 4 to display the sales website. If the user operates the inputting device 6 to select desired game software, then an accounting process is performed and license information is given to the information processing device 10. Then, the download execution section 106 transmits a download request including specification information (title ID) of the game to be downloaded to the content server 12.

The content server 12 receives the download request and transmits screen image data for causing a play mode of the game to be selected to the information processing device 10 together with response information for permitting the download. The acceptance section 100 receives the screen image data, and the play mode selection screen image displaying section 108 displays a screen image for selecting a play mode relating to the download of the game software 70 on the outputting device 4. It is to be noted that, since, in the embodiment, software downloaded is installed into the auxiliary storage device 2 and enabled for execution, from the point of view of game execution, the play mode selection screen image displaying section 108 displays a screen image for selecting a play mode relating to installation of the game software 70 on the outputting device 4.

<When Game Software is Installed for the First Time>

Figure 8:
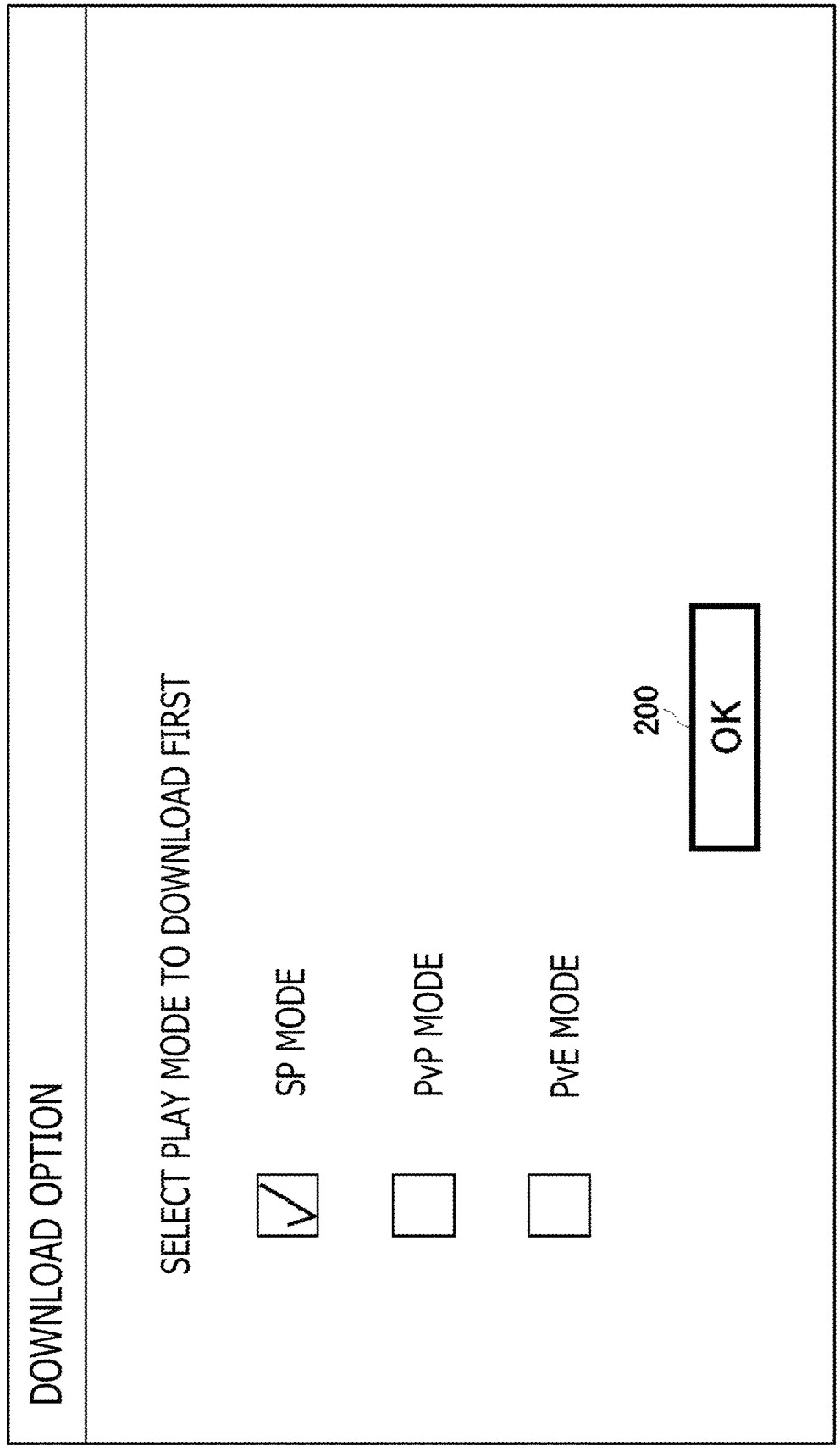
FIG. 8 is a view depicting an example of a first selection screen image for selecting a play mode.

FIG. 8 depicts an example of a first selection screen image for selecting a play mode. When the game software 70 is installed for the first time, the play mode selection screen image displaying section 108 displays a first selection screen image for allowing the user to select a play mode to install first from a plurality of play modes on the outputting device 4. The first selection screen image displays a message "Select play mode to download first," and the user operates the inputting device 6 to move a focus frame 200 and select a play mode in which the user wants to play first. In this example, the "SP mode" is selected. After the play mode is selected, the user moves the focus frame 200 to a graphical user interface (GUI) indicated as "OK" and operates a decision button of the inputting device 6. The play mode selection screen image displaying section 108 receives the operation of the GUI and displays a second selection screen image on the outputting device 4.

FIG. 9 depicts an example of the second selection screen image for selecting a play mode. In the information processing system 1 of the embodiment, there is no necessity to install all play modes of the game software 70, and a contrivance for installing only the play mode desired by the user is provided.

The play mode selection screen image displaying section 108 displays a second selection screen image for selecting a play mode not to install or a play mode to install, on the outputting device 4. When the game software 70 is to be installed for the first time, the play mode selection screen image displaying section 108 first displays the first selection screen image and then displays the second selection screen image on the outputting device 4.

On the second selection screen image, a message "Select play mode not to download" is displayed, and the user operates the inputting device 6 to move the focus frame 200 and select a play mode not to install. In this example, the user determines that there is no possibility to play the "PvP mode," and the "PvP mode" is selected as a play mode not to be downloaded. It is to be noted that, if the user determines that there is the possibility that all the play modes may be played, then the user may not select any one of the play modes.

It is to be note that, if the user selects the "SP mode" on the first selection screen image, then it has been decided that the "SP mode" is the play mode to be downloaded first. At this time, since it is necessary to download the "SP mode," the second selection screen image may be displayed such that the "SP mode" cannot be selected by the user in order to avoid an erroneous operation of the user.

Further, on the second selection screen image, a message "Select play mode to download" may be displayed in place of the message "Select play mode not to download." In this case, the user operates the inputting device 6 to move the focus frame 200 and select a play mode to install but not a play mode that is not to be installed. In this manner, on the second selection screen image, the user can select a play mode not to install or a play mode to install. Thereafter, the user moves the focus frame 200 to a GUI displayed as "Download" and operates the decision button of the inputting device 6.

Selection information of the play modes inputted on the first selection screen image and the second selection screen image is acquired by the acceptance section 100 and presented to the download execution section 106. In this example, information that the SP mode is to be downloaded first and information that the SP mode and the PvE mode are to be downloaded are provided as the selection information of the play modes to the download execution section 106.

At the time of starting of a download process, the group decision section 104 decides the first group 72a of the game software 70 as a target to be downloaded first. The download execution section 106 transmits a download request including information that specifies the group decided by the group decision section 104 (group specification information) to the content server 12.

Upon reception of the download request including the group specification information, the content server 12 transmits the files belonging to the group 72 of the game software 70 designated by the group specification information to the information processing device 10. In the information processing device 10, the download execution section 106 downloads the files of the game software 70 transmitted thereto.

When the content server 12 transmits the files included in the first group 72a, the download execution section 106 downloads the files, and the installation execution section 110 installs the downloaded files into the auxiliary storage device 2. Consequently, the game execution section 102 is enabled to start up the game. The group decision section 104 decides a group of the game software 70 to download next, and the download execution section 106 transmits a download request including information that specifies the decided group to the content server 12.

The first group 72a includes the group file that describes groups to which files belong and describes a plurality of groups whose installation is necessary when each play mode is to be executed. The group decision section 104 refers to the group file to specify the groups of the play mode (SP mode) selected by the user so as to be installed first. The order of the download is decided according to the order of the group numbers, and in particular, the group decision section 104 may decide a group having a smaller number as a target to be downloaded earlier.

The download execution section 106 transmits a download request including the specification information of the group specified by the group decision section 104 to the content server 12. The content server 12 receives the download request including the group specification information and transmits files belonging to the group 72 of the game software 70 designated by the group specification information to the information processing device 10. It is to be noted that the order number of a play mode to be downloaded second or later may be decided in advance.

In the embodiment, the download execution section 106 downloads the game files in the order of the SP mode and the PvE mode, and the installation execution section 110 installs the game files into the auxiliary storage device 2. Since the download execution section 106 does not download the PvP mode selected by the user as unnecessary to install, the installation execution section 110 does not install the game files of the PvP mode into the auxiliary storage device 2 and can thereby avoid wasteful use of the storage capacity.

<When Game Software is to Be Re-Installed>

The user may uninstall (delete) game software from the auxiliary storage device 2 for various reasons. For example, in a case where new game software cannot be installed because of insufficient available capacity of the auxiliary storage device 2, the user temporarily uninstalls game software that has not recently been played from the auxiliary storage device 2 in order to increase the available capacity. As long as the license information is valid, the user can anytime re-install the uninstalled game software freely into the auxiliary storage device 2.

In a re-installation process of game software, the content server 12 receives a download request from the information processing device 10 and transmits screen image data for allowing the user to select a play mode of the game to the information processing device 10 together with response information for permitting download. The content server 12 has stored therein the play mode immediately before the information processing device 10 fully uninstalls the game software 70, and reflects the storage content upon the screen image data. In short, the content server 12 has stored therein the play mode having been installed to the last in the information processing device 10, and reflects the play mode on the screen image data to be provided upon re-download. In this example, the SP mode and the PvE mode are stored as play modes that have been installed to the last.

The acceptance section 100 receives the screen image data, and the play mode selection screen image displaying section 108 displays a screen image for selecting a play mode relating to re-download of the game software 70 on the outputting device 4.

Figure 10:
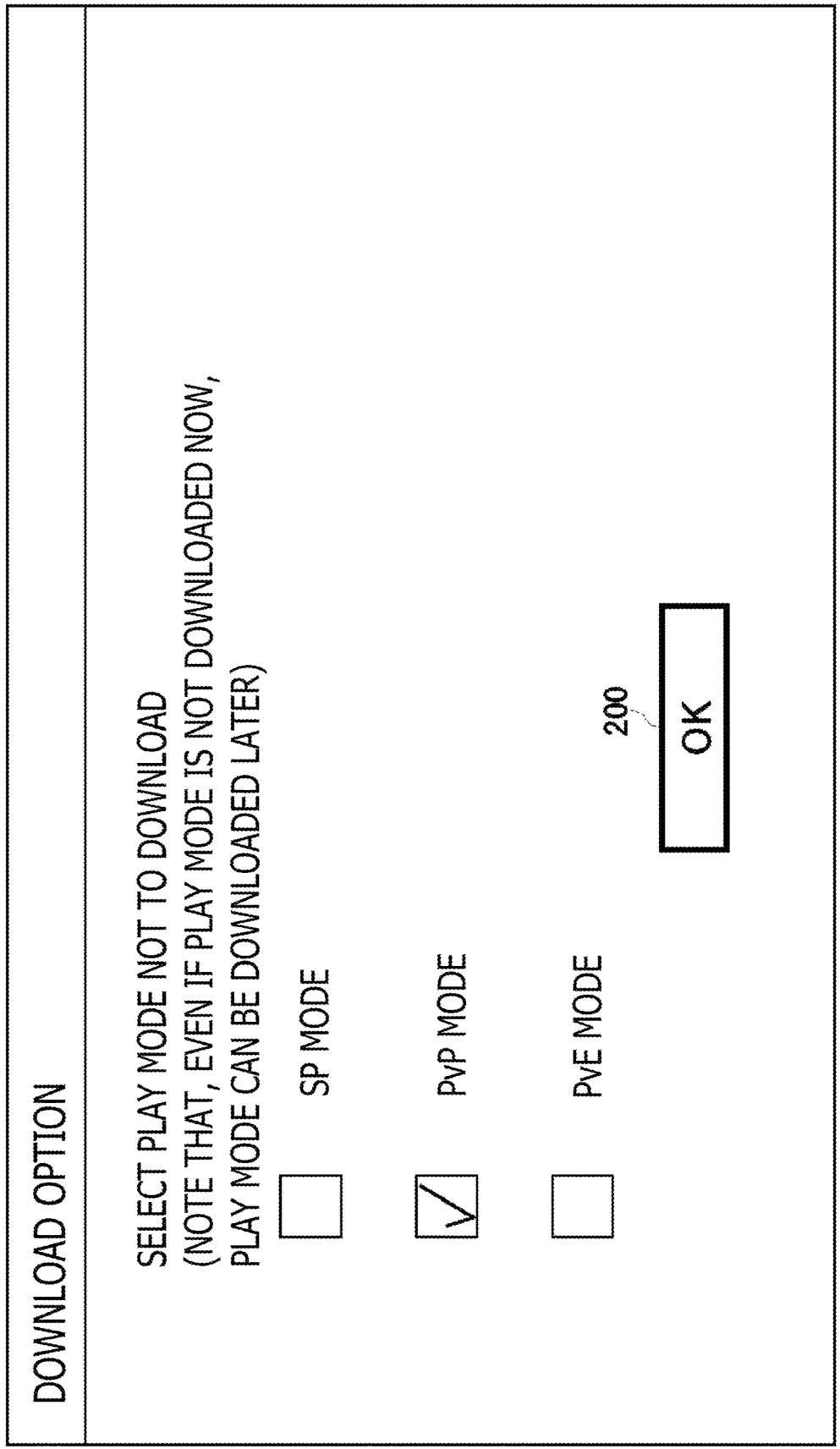
FIG. 10 is a view depicting an example of the second selection screen image for selecting a play mode.

FIG. 10 depicts an example of the second selection screen image for selecting a play mode. As depicted in FIG. 9, the second selection screen image is a screen image for selecting a play mode not to install or a play mode to install. When the game software 70 that was installed in the past is to be installed again, the play mode selection screen image displaying section 108 displays the second selection screen image on the outputting device 4 before the first selection screen image.

As depicted in FIG. 10, the PvP mode is in a selected state by default. This is based on the fact that the PvP mode was not installed in the auxiliary storage device 2 in the past, and from an estimation that the possibility that the PvP mode may be installed is low this time, too, the content server 12 generates screen image data of a state in which the PvP mode is selected. It is to be noted that, if the user desires to play the PvP mode this time, then it is sufficient if the user cancels the selection of the PvP mode.

It is to be noted that there may be a case where, before the game software 70 is uninstalled entirely, some of the play modes have been uninstalled partly. For example, there may be a case where, after the SP mode and the PvE mode were installed, the PvE mode has been uninstalled. In this case, the possibility that the user may not play the PvE mode in the future is high. In such a case, the second selection screen image may not display a choice for the PvE mode.

Since the PvP mode is selected from the beginning, the user can be reminded that the PvP mode was not installed in the past. On the second selection screen image, the user operates the inputting device 6 to move the focus frame 200 and select a play mode that is not to be installed. After a play mode not to be installed is selected, the user moves the focus frame 200 to a GUI displayed as "OK" and operates the decision button of the inputting device 6. The play mode selection screen image displaying section 108 receives the operation of the GUI and displays the first selection screen image on the outputting device 4.

Figure 11:
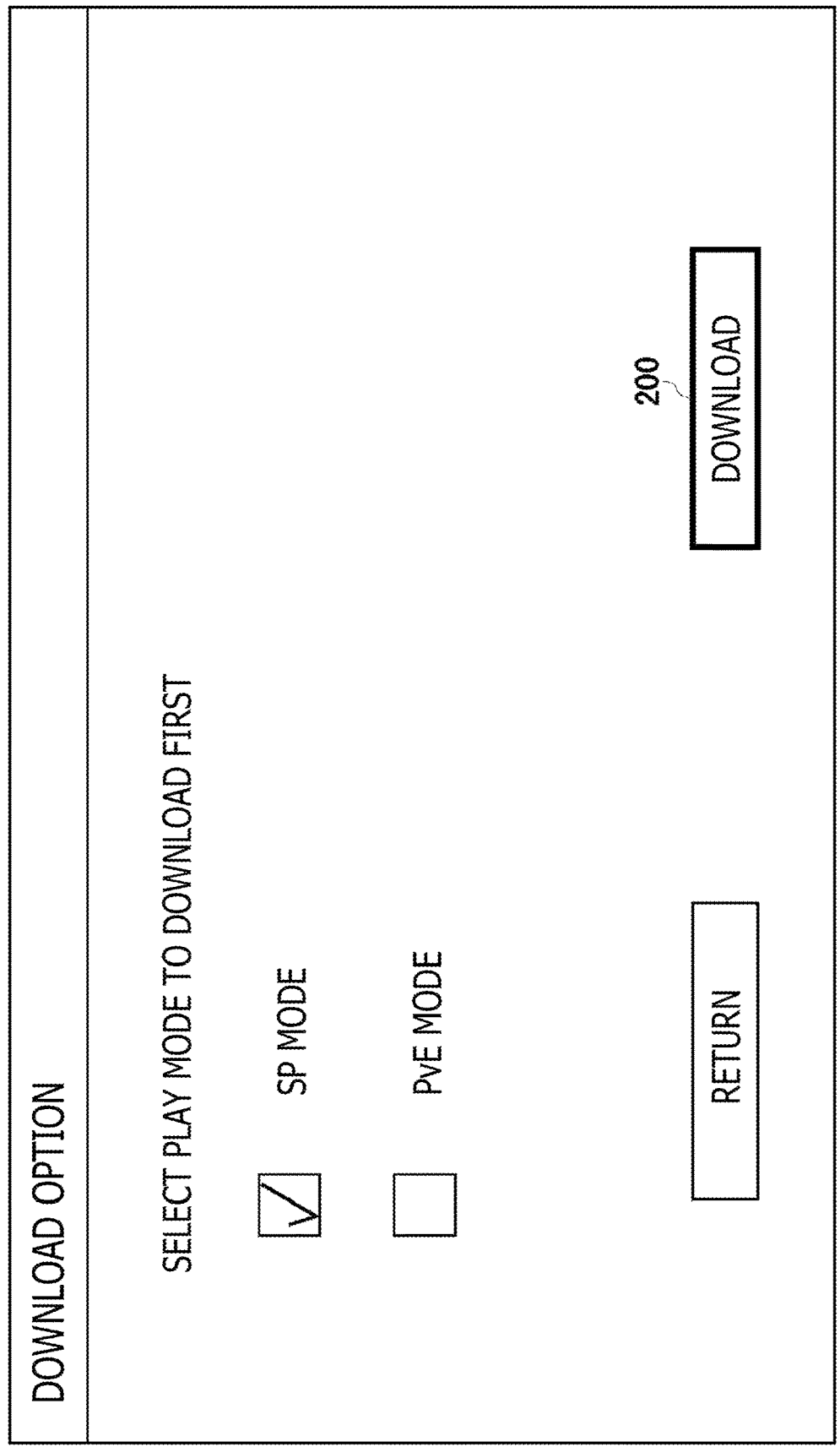
FIG. 11 is a view depicting an example of the first selection screen image for selecting a play mode.

FIG. 11 depicts an example of the first selection screen image for selecting a play mode. As depicted also in FIG. 8, the first selection screen image is a screen image for selecting a play mode to install first from a plurality of play modes. When the game software 70 installed in the past is to be installed again, the play mode selection screen image displaying section 108 displays the first selection screen image on the outputting device 4 after it displays the second selection screen image.

As depicted in FIG. 11, the first selection screen image does not include a choice for the PvP mode selected on the second selection screen image depicted in FIG. 10. Where the play mode selection screen image displaying section 108 displays the second selection screen image before the first selection screen image on the outputting device 4, the choices to be included in the first selection screen image can be narrowed down.

The user operates the inputting device 6 to move the focus frame 200 and select a play mode in which the user wants to play first. In this example, the "SP mode" is selected. After the play mode is selected, the user moves the focus frame 200 to a GUI displayed as "Download" and operates the decision button of the inputting device 6.

The selection information of the play modes inputted on the second selection screen image and the first selection screen image is acquired by the acceptance section 100 and provided to the download execution section 106. In this example, the information that the SP mode is to be downloaded first and the information that the SP mode and the PvE mode are to be downloaded are provided as play mode selection information to the download execution section 106. The download execution section 106 downloads the files necessary for the respective play modes in accordance with the procedure described above, and the installation execution section 110 installs the files into the auxiliary storage device 2.

It is to be noted that, when the game software 70 is to be re-installed, saved data at the time of interruption of a game play in the past sometimes remains in the information processing device 10 or the network server 5. In this case, the download execution section 106 may download a plurality of files that make it possible to use the saved data of the game played in the past by the user such that, after the installation execution section 110 installs the downloaded files, the game execution section 102 is enabled for execution of the game.

For example, in a case where the saved data retains play data of a stage N, the group decision section 104 specifies a group necessary to play the stage N, and the download execution section 106 downloads files included in the specified group from the content server 12. Although the installation execution section 110 sequentially installs the downloaded files into the auxiliary storage device 2, the game execution section 102 cannot start up the game until all the files necessary to play the stage N are installed. After the installation execution section 110 installs all the files necessary to play the stage N, the game execution section 102 is enabled to start up the game, and the user is enabled to select a game icon for starting up the game.

During the download, the progress status displaying section 112 displays a progress bar indicative of a progress status of the download in a download confirmation screen image.

Figure 12:
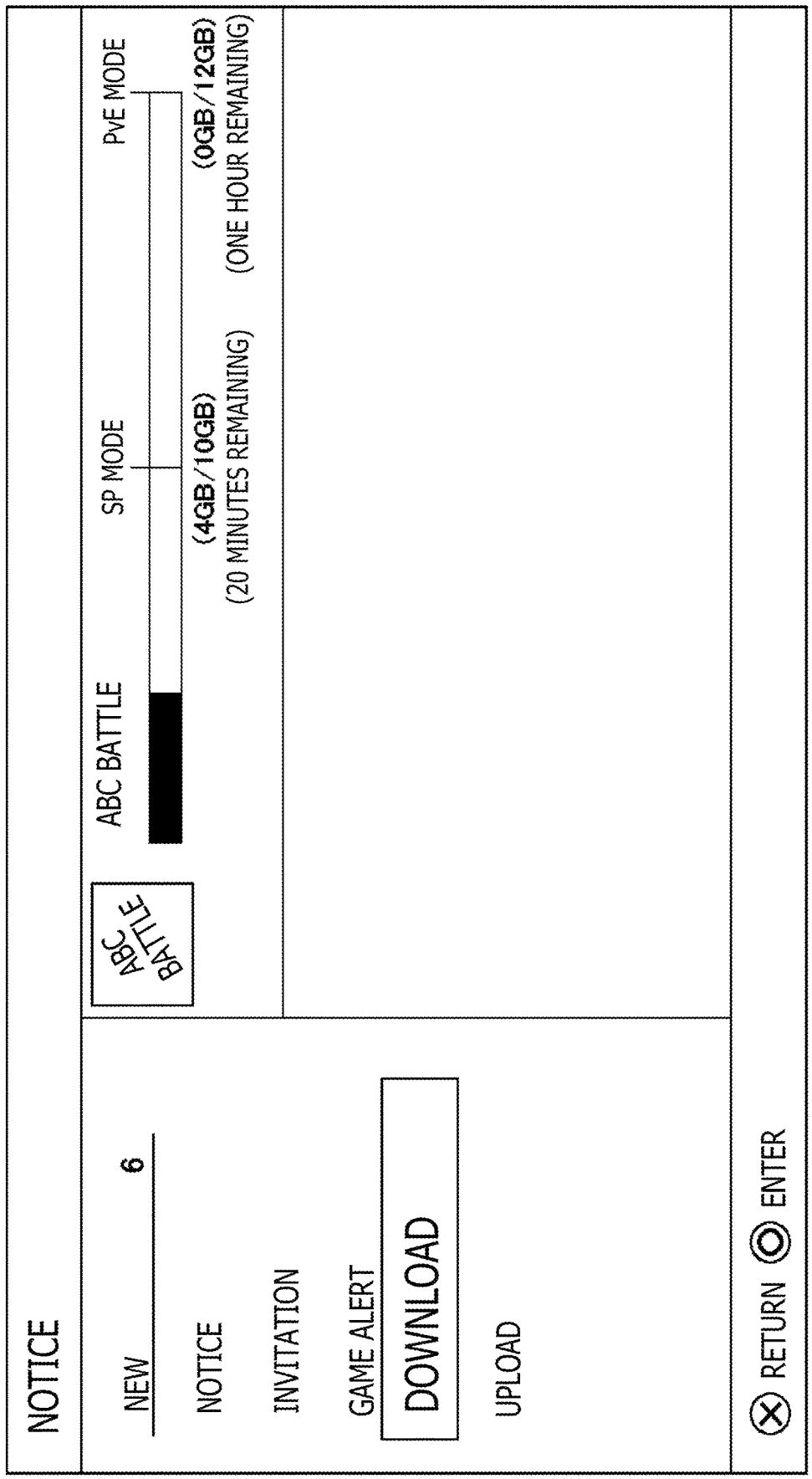
FIG. 12 is a view depicting an example of a download confirmation screen image.

FIG. 12 depicts an example of the download confirmation screen image. In this example, a download progress status of "ABC battle" is indicated. The progress status displaying section 112 may represent the download progress status of the modes in the form of a single progress bar. By viewing the progress bar, the user can tell at which timing download of the game files of each play mode is completed. It is to be noted that, where the user is not viewing the download confirmation screen image, when installation of the play modes is completed, the notification section 114 may display popup information indicating that the installation has been completed on the outputting device 4. For example, where a home screen image is displayed on the outputting device 4 or where the user is playing a different game and a game screen image is displayed on the outputting device 4, the notification section 114 can display popup information indicating that installation of each play mode of "ABC battle" has been completed such that the user can tell that the play modes are ready to be played.

It is to be noted that, when a play mode to be installed is selected on the second selection screen image by the user, the download execution section 106 issues an inquiry about a data amount to be downloaded to the content server 12. If the data amount to be downloaded is smaller than the available capacity of the auxiliary storage device 2, then the download execution section 106 starts the download process.

On the other hand, if the data amount to be downloaded is greater than the available capacity of the auxiliary storage device 2, the download execution section 106 gives a notification to this effect to the user.

FIG. 13 depicts an example of a screen image giving a notification to the effect that the available capacity is insufficient. In this case, the user is given two choices. One choice is to cancel the download, and the other choice is to uninstall (delete) game software that is already installed, to thereby increase the available capacity of the auxiliary storage device 2. In the present example, while the data amount of "ABC battle" is 22 GB, the available capacity is smaller by 18 GB. If the user wants to perform installation, the user moves the focus frame 200 to a GUI displayed as "Uninstall game or games that are already installed" and operates the decision button of the inputting device 6.

FIG. 14 depicts an example of a screen image for selecting a game to uninstall. If shortage of the capacity of the auxiliary storage device 2 occurs, then the game selection screen image displaying section 116 displays a screen image for selecting game software to delete. In this example, the game selection screen image displaying section 116 displays a list of game titles installed in the auxiliary storage device 2 and data sizes of the respective game titles on the outputting device 4. For example, the games may be arranged from the top in order from the game with the oldest date and time of last play. When the user decides a game title or titles to uninstall, then the data size of the game title or titles is accumulated and displayed in a cumulative size display field 122.

Before selection of game software to uninstall, an uninstallation button 120 provided in the lower right corner in the screen image is displayed in an inoperable state. The uninstallation button 120 is placed into an operable state when the cumulative total of the data size of game software to be uninstalled exceeds the capacity shortage amount (18 GB). When the user moves the focus frame 200 to a game title and operates a selection button of the inputting device 6, a screen image for selecting a play mode to uninstall is displayed.

FIG. 15 depicts an example of a screen image for selecting a play mode to uninstall. The game selection screen image displaying section 116 displays a list of play modes of a selected game title and data sizes of the respective play modes on the outputting device 4. In short, the game selection screen image displaying section 116 displays choices for deleting game software in a unit of a play mode. When the user decides a play mode or modes to uninstall, the data size of the play mode or modes is accumulated and displayed in the cumulative size display field 122.

FIG. 16 depicts an example of a screen image for selecting a game to uninstall. As a result of decision of game software to uninstall, the cumulative total of the data size exceeding the capacity shortage amount is displayed in the cumulative size display field 122. If the data size to be deleted exceeds the capacity shortage amount, then the uninstallation button 120 is placed into an operable state. When the user moves the focus frame 200 to a GUI displayed as "Uninstall" and operates the decision button of the inputting device 6, the selected game software or play mode is deleted from the auxiliary storage device 2, and a state in which "ABC battle" can be installed is established. When the uninstallation button 120 is operated, the installation execution section 110 uninstalls the selected software or play mode from the auxiliary storage device 2 and may start installation of "ABC battle."

The present invention has been described on the basis of the embodiment. This embodiment is exemplary, and it is recognized by those skilled in the art that various modifications are possible in regard to the combinations of the components, processes, and so forth of the embodiment and that also such modifications fall within the scope of the present invention. While the embodiment has been described taking a game as an example of an application, any other type of application may be applied.

While the embodiment has been described in regard to an example in which the game software 70 is downloaded to be installed, the game software 70 may otherwise be provided from the ROM medium 44. Also, in this case, an efficient installation process is implemented by the installation execution section 110 installing game files in a unit of a group.

INDUSTRIAL APPLICABILITY

The present invention can be utilized in a technical field in which software is installed.

REFERENCE SIGNS LIST

1: Information processing system
2: Auxiliary storage device
10: Information processing device
12: Content server
70: Game software
100: Acceptance section
102: Game execution section
104: Group decision section
106: Download execution section
108: Play mode selection screen image displaying section
110: Installation execution section
112: Progress status displaying section
114: Notification section
116: Game selection screen image displaying section

The invention claimed is:
1. An information processing device comprising:
circuitry configured to
control a display to display a screen image for selecting a play mode from a plurality of play modes of a game software after a user has selected the game software to be installed;
install the game software into a storage device, wherein in a case that the game software is to be installed for a first time, the circuitry is configured to control the display to display a first selection screen image for allowing the user to select a first play mode from the plurality of play modes to install first from the plurality of play modes and then display a second selection screen image for allowing the user to select a second play mode from the plurality of play modes not to install when the game software is installed for a first time; and control the display to first display the second selection screen image before displaying the first selection screen image in a case that the game software is being reinstalled after being previously uninstalled.

2. The information processing device of claim 1, wherein in a case that the game software uninstalled in the past and is later being installed again, the circuitry is configured to control the display to display the first selection screen image for selecting a play mode to install first after displaying the second selection screen image for selecting a play mode not to install.

3. The information processing device of claim 1, wherein the circuitry is configure to execute a game, the game software includes a plurality of groups and, when the circuitry installs a file belonging to a first group of the game software, the circuitry is enabled to start up the game, and after the circuitry installs a plurality of files that enable saved data of a game played in the past by the user to be used, the circuitry is enabled to execute the game.

4. The information processing device of claim 1, wherein the circuitry is configured to control the display to:

display a screen image for selecting other game software to delete in a case that shortage of capacity of the storage device occurs when the game software is to be installed; and display a choice for deleting other game software in a unit of a play mode.

5. The information processing device of claim 1, wherein the circuitry is configured to control the display to switch from displaying the first screen selection image to the second selection screen image in response to receiving a user input at the first selection screen image.

6. The information processing device of claim 1, wherein the circuitry is configured to switch from displaying the second selection screen image to displaying the first selection screen image in response to receiving a user input at the second selection screen image.

7. The information processing device of claim 1, wherein the circuitry is configured to control the display to display a user interface indicating that the storage device has insufficient capacity to install the game software.

8. The information processing device of claim 7, wherein the user interface displays a memory size corresponding to at least the first play mode selected from the plurality of play modes for installation.

9. The information processing device of claim 8, wherein the user interface displays a capacity shortage amount corresponding to a difference between the memory size corresponding to at least the first play mode and an available capacity of the storage device.

10. The information processing device of claim 7, wherein the user interface is configured to display a plurality of other game software installed at the information processing device as candidates to be uninstalled to make capacity in the storage device for the game software to be installed.

11. The information processing device of claim 10, wherein the user interface is configured to display a memory size of each of the plurality of other game software installed at the information processing device as candidates to be uninstalled.

12. The information processing device of claim 10, wherein the user interface is configured to receive a user input selecting at least one of the plurality of other game software installed at the information processing device.

13. The information processing device of claim 12, wherein the user interface is configured to display a capacity shortage amount corresponding to a difference between a memory size of the game software and an available capacity of the storage device.

14. The information processing device of claim 13, wherein the circuitry is configured to update the user interface to display an updated capacity shortage amount of the storage device, which corresponds to a difference between a memory size of the game software and an available capacity of the storage device in a case that the selected one of the plurality of other games is uninstalled.

15. The information processing device of claim 14, wherein the user interface is configured to receive a user input corresponding to a selection to uninstall the selected one of the plurality of other games.

16. The information processing device of claim 15, wherein the circuitry is configured to uninstall the selected one of the plurality of other games in response to the user input.

17. An installation method comprising:

displaying a first selection screen image for selecting a play mode from a plurality of play modes of a game software after a user has selected the game software to be installed;

displaying a second selection screen image after displaying the first selection screen image for selecting a play mode not to install from the plurality of play modes;

installing game software on a basis of information inputted to the first selection screen image and the second selection screen image; and displaying the second selection screen image before displaying the first selection screen image in a case that the game software is being reinstalled after being previously uninstalled.

18. A non-transitory computer readable medium having stored thereon a program, which when executed by a computer, causes the computer to:

display a first selection screen image for selecting a play mode from a plurality of play modes of a game software after a user has selected the game software to be installed;

display a second selection screen image after displaying the first selection image screen for selecting a play mode not to install from the plurality of play modes when the game software is installed for a first time;

install the game software on a basis of information inputted to the first selection screen image and the second selection screen image; and display the second selection screen image before displaying the first selection screen image in a case that the game software is being reinstalled after being previously uninstalled.

* * * * *